United States Patent [19]

Schultz

[11] Patent Number: 5,666,247
[45] Date of Patent: Sep. 9, 1997

[54] NO-FIELD, LOW POWER FEMN DEPOSITION GIVING HIGH EXCHANGE FILMS

[75] Inventor: Allan E. Schultz, St. Paul, Minn.

[73] Assignee: Seagate Technology, Inc., Scotts Valley, Calif.

[21] Appl. No.: 437,646

[22] Filed: May 9, 1995

Related U.S. Application Data

[62] Division of Ser. No. 191,621, Feb. 4, 1994, abandoned.
[51] Int. Cl.$^6$ .............................. G11B 5/39; C23C 14/34
[52] U.S. Cl. ............................ 360/113; 204/192.2
[58] Field of Search ........................ 204/192.12, 192.2, 204/192.3; 427/130, 131; 216/22; 360/113

[56] References Cited

U.S. PATENT DOCUMENTS

| | | | |
|---|---|---|---|
| 4,103,315 | 7/1978 | Hempstead et al. | 360/110 |
| 4,663,685 | 5/1987 | Tsang | 360/113 |
| 4,755,897 | 7/1988 | Howard | 360/113 |
| 4,782,413 | 11/1988 | Howard et al. | 360/113 |
| 4,809,109 | 2/1989 | Howard et al. | 360/113 |
| 4,825,325 | 4/1989 | Howard | 360/113 |
| 5,014,147 | 5/1991 | Parkin et al. | 360/113 |
| 5,262,914 | 11/1993 | Chen et al. | 360/113 |

OTHER PUBLICATIONS

Nakamura, Yoji et al., *Exchange Anisotropy of $Fe_{65}(Ni_{1-x}Mn_x)_{35}$ Alloys*, Journal of the Physical Society of Japan, vol. 23, No. 2, Aug. 1967, pp. 223–229.

Ounadjela, K. et al., *Effect of Surface Composition Observed by Auger Electron Spectroscopy of Magnetization and Magnetostriction of NiFe and NiFeRh Thin Films*, J. Appl. Phys, 65(3), Feb. 1, 1989, pp. 1230–1233.

Russak, M.A. et al., *MnFe and NiFe Thin Films and Magnetic Exchange Bilayers*, J. Electrochem. Soc., vol. 136, No. 6, Jun. 1989, pp. 1793–1798.

Schlenker, C. et al., *Magnetic Disorder in Exchange Bias Bilayered FeNi–FeMn System*, Journal of Magnetism and Magnetic Materials, 54–57, (1986), pp. 801–802.

Speriosu, V.S. et al. *Standing Spinwaves in FeMn/NiFe/FeMn Exchange–Bias Structures*, IEEE Transactions on Magnetics, vol. Mag-23, No. 5, Sep. 1987, pp. 2999–3001.

Tsang, C. et al., *Exchange Induced Unidirectional Anistropy at $FeMn-Ni_{80}Fe_{20}$ Interfaces*, J. Appl. Phys. 52(3), Mar. 1981, pp. 2471–2473.

Tsang, C. et al., *Temperature Dependence of Unidirectional Anisotropy Effects in the Permalloy FeMn Systems*, IBM Research Lab, pp. 1–3.

Kung et al., "Exchange . . . MnFeCr", IBM Storage Division, IBM Magnetic Rec. Inst., Almaden Research Center pp. 1–12.

Toney et al., "Thermal . . . Films", IBM Almaden Research Center, pp. 1–13.

*Primary Examiner*—Nam Nguyen
*Attorney, Agent, or Firm*—Kinney & Lange, P.A.

[57] ABSTRACT

A method of producing a magnetoresistive read transducer with improved longitudinal bias due to high exchange coupling is disclosed. A layer of antiferromagnetic material is sputtered deposited onto a layer of ferromagnetic material in the absence of a magnetic field and at a power density below 0.7 W/cm$^2$. The layers of ferromagnetic material and antiferromagnetic material are annealed at a low temperature of between 200° C. and 250° C. for between 6 and 26 hours.

14 Claims, 3 Drawing Sheets

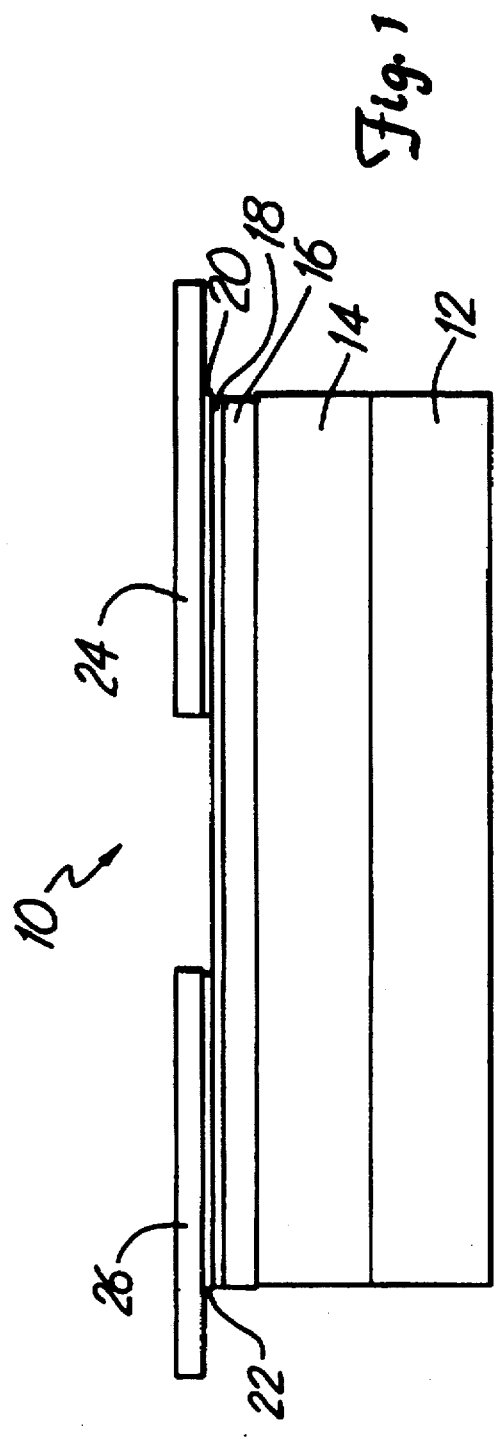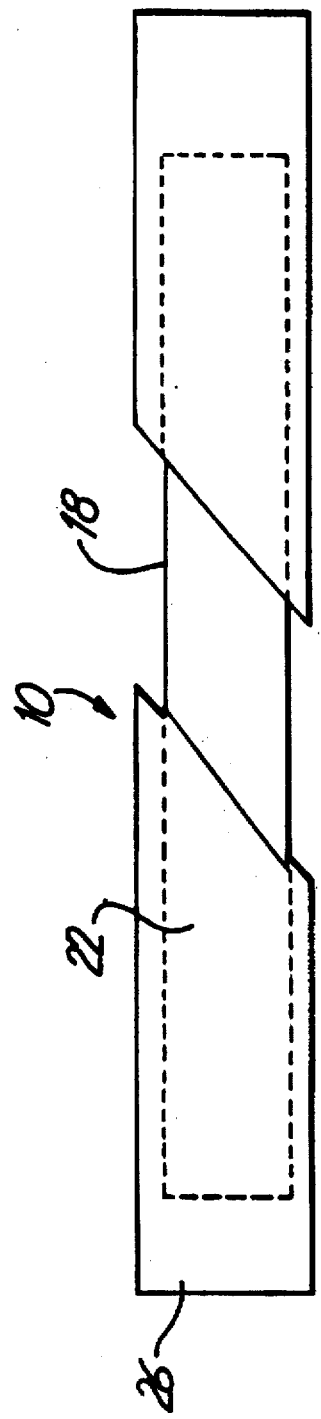

5,666,247

NO-FIELD, LOW POWER FEMN DEPOSITION GIVING HIGH EXCHANGE FILMS

This is a divisional application of application Ser. No. 08/191,621, filed Feb. 4, 1994, abandoned. Priority of the prior application is claimed pursuant to 35 USC § 120.

BACKGROUND OF THE INVENTION

The invention relates to magnetic transducers for reading information signals from a magnetic medium. In particular, the invention relates to an improved method of depositing magnetoresistive heads which include a layer of antiferromagnetic material suitable for exchange stabilization of the magnetoresistive sensor.

Magnetoresistive (MR) heads with magnetoresistive elements (MREs) or sensors are known magnetic transducers which are capable of reading data from the surface of a magnetic media at higher densities than inductive sensor heads. MR sensors detect flux changes in a magnetic media as resistance changes in the sensor. The MR sensor is made from a ferromagnetic magnetoresistive material which exhibits resistance changes as a function of the amount and direction of magnetic flux being sensed by the element.

Permalloy (with a composition near 80 Ni 20 Fe, but abbreviated as NiFe) is frequently used as material for MR sensors because of its high magnetic permeability and good magnetoresistive response (known as $\Delta\rho$). When an NiFe MR sensor is exposed to external magnetic fields, it can be transformed from a single-domain sensor into multi-domain sensor. Transformation of the NiFe MR sensor from single domain into multi-domain is undesirable because of the resulting lack of stability and loss of output amplitude from the sensor.

One method Of maintaining NiFe MR sensors in a single domain state is known as exchange field stabilization. Exchange field stabilization of MR heads involves the use of an anti-ferromagnetic thin film material, such as 50 Fe 50 Mn, to stabilize the NiFe MR sensor. A great deal of research has been done on the use of materials such as FeMn to stabilize NiFe MR sensors. In exchange field stabilization, one of the magnetic lattices of the antiferromagnetic film couples to the magnetic lattice of the NiFe film. Since the FeMn film is not susceptible to stray fields, this coupling between the antiferromagnetic film and the NiFe film preserves the domain state of the MR sensor from the influence of the stray field.

Prior research and publications in the art concerning the use of FeMn to achieve high exchange coupling for exchange stabilization of MR heads have disclosed methods of producing MR heads which present a number of manufacturing difficulties. For instance, the prior art publications report that after depositing the NiFe and FeMn films, the films must be annealed at temperatures as high as 270° C. for time periods as long as several days in order to achieve high exchange fields. Annealing at these high temperatures and for these extended periods of time is not practical for manufacturing large quantities of MR heads. Many of these prior art methods require multiple anneal cycles which is time consuming and undesirable in a manufacturing environment. Also, known fabrication techniques use power densities as high as 2.6 W/cm² to sputter deposit the films, which can cause substantial interdiffusion of the films at their interface. Additionally, in order to create an NiFe MR sensor with the proper magnetic domain orientation, prior art manufacturing methods normally require that the NiFe film be sputter deposited in the presence of an applied external magnetic field using permanent magnets attached to the pallet near the wafer. However, if the FeMn film is sequentially sputter deposited without breaking vacuum, the external applied magnetic field makes it difficult to maintain thickness uniformities of more than ±10 percent which, in some MR head designs, is critical.

One attempt to improve the manufacturability of MR heads while maintaining adequate exchange fields is disclosed in U.S. Pat. No. 5,262,914 which issued Nov. 16, 1993 to Chen et al. Chen et al. discloses a method of producing an MR sensor with a claimed reduction of innealing temperatures and times to 240° C. and seven hours, respectively. However, the method of producing MR heads with enhanced exchange field of Chen et al. requires the addition of a thin layer of interdiffusion material such as Au in contact with the layer of FeMn. This addition of an extra thin film layer causes an undesirable increase in manufacturing complexity, as well as other design related problems. For instance, many MR head designs use Au, for example, as contacts for the MR head. In Chen et al., in order to allow the Au to diffuse into the FeMn, films such as Ta and Mo which act as adhesion promoters and diffusion barriers must be removed. Requiring diffusion of Au into FeMn, while preventing it from entering NiFe, increases manufacturing complexity. Also, in most MR head designs, the layer or layers of Fe Mn are kept as thin as possible in order to reduce the height of the device. Frequently, the layer of FeMn will be around 150 Angstroms. With such a thin layer of FeMn, the Au or other interdiffusion material is capable of diffusing through the layer of FeMn and into the NiFe sensor, possibly adversely affecting the NiFe sensor's performance.

SUMMARY OF THE INVENTION

The present invention provides numerous manufacturing advantages and is based upon the recognition that there is a method of producing a magnetoresistive read transducer with high exchange field stabilization which allows the layer of ferromagnetic material and the layer of antiferromagnetic material to be deposited non-sequentially and which requires lower anneal temperatures and shorter anneal times. First, depositing the layers non-sequentially allows the layer of magnetoresistive ferromagnetic material to be deposited, patterned and etched by whatever methods, and under whatever conditions, are most favorable. After patterning, etching and presputtering the layer of ferromagnetic material, the layer of antiferromagnetic material may be sputter deposited, with a low deposition power and in the absence of applied magnetic fields, onto the layer of ferromagnetic material. Thickness uniformities of the antiferromagnetic material are improved by depositing it in the absence of an applied field. Depositing at low power prevents the antiferromagnetic material from penetrating the layer of ferromagnetic material. Finally, the layers of ferromagnetic and antiferromagnetic material may be annealed at lower temperatures and over shorter time periods than are required by prior art methods of producing magnetoresistive read transducers with exchange stabilization. The magnetoresistive read transducer of the present invention exhibits very high exchange coupling, produced at a low anneal temperature in a single anneal cycle, without the use of interdiffusion materials.

The method of producing a magnetoresistive read transducer of the present invention includes depositing a layer of magnetoresistive ferromagnetic material. The magnetoresistive ferromagnetic material is patterned and, etched. Before the layer of antiferromagnetic material is sputter deposited onto the layer of ferromagnetic material, the ferromagnetic film is presputtered to remove surface oxide such that the layer of antiferromagnetic material is in direct contact with the layer of ferromagnetic material. Finally, the layers of ferromagnetic material and antiferromagnetic material are annealed.

In some preferred embodiments of the present invention, the layer of antiferromagnetic material is sputter deposited in an applied magnetic field of between 0 and 50 Oe.

In other preferred embodiments of present invention, the layer of antiferromagnetic material is sputter deposited with a deposition power of between about 60 and 200 W (power densities of about 0.2 to 0.7 W/cm$^2$).

In yet other preferred embodiments of the present invention; the layers of ferromagnetic material and antiferromagnetic material are annealed at a temperature of between 200° and 250° C. In still other preferred embodiments, the layers of ferromagnetic material and antiferromagnetic material are annealed only for a single period of between 6 and 26 hours.

BRIEF DESCRIPTION OF THE DRAWINGS

FIG. 1 is a side layer diagram of a MR head which utilizes exchange stabilization to stabilize the magnetoresistive sensor.

FIG. 2 is a top layer diagram of the MR head shown in FIG. 1.

DETAILED DESCRIPTION OF THE PREFERRED EMBODIMENTS

Figure 3:
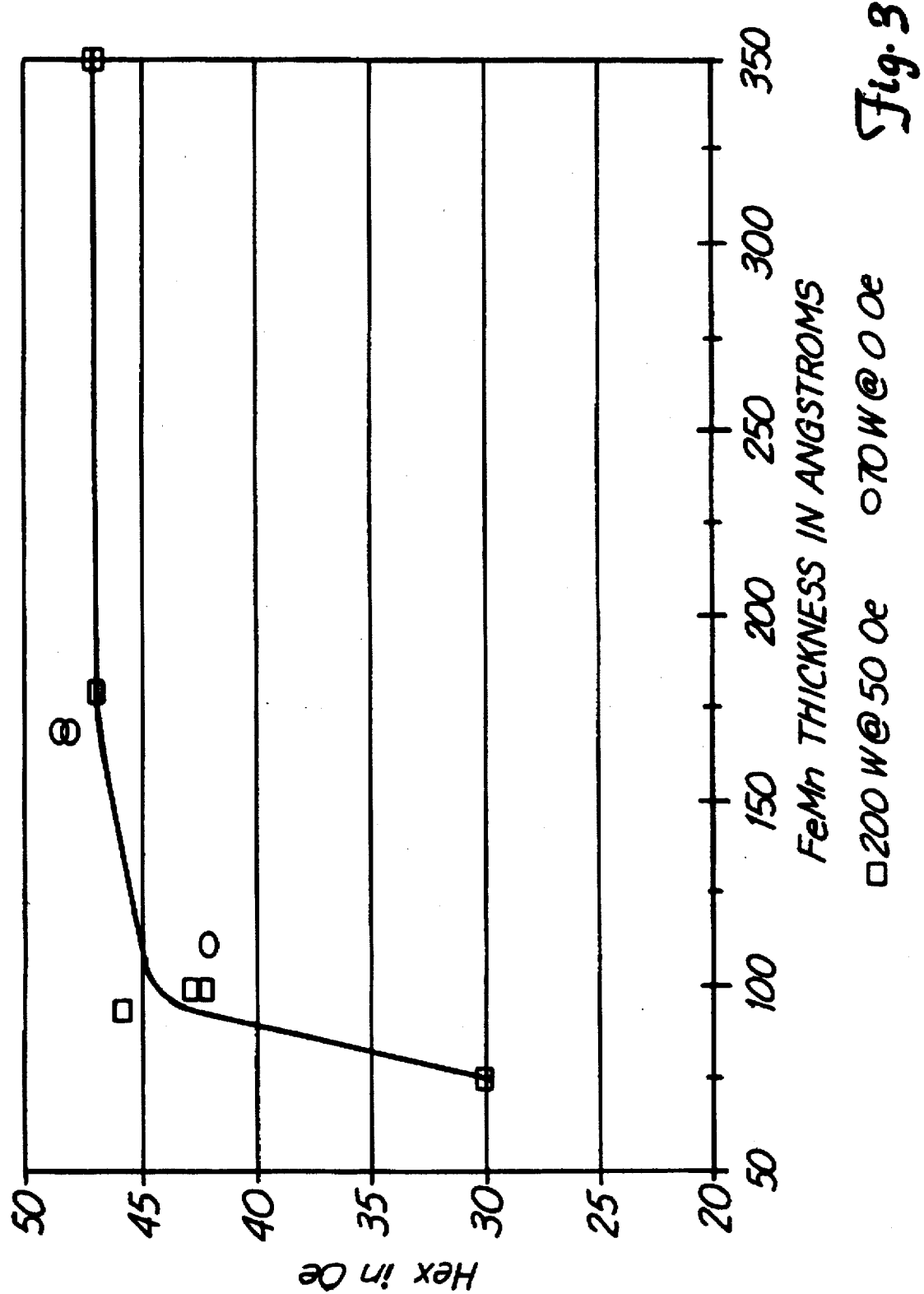
FIG. 3 is a graph illustrating exchange field magnitude versus FeMn thickness.

FIGS. 1 and 2 are layer diagrams of MR head 10. MR head 10 includes layer of basecoat oxide 12, bottom shield layer 14, lower gap oxide layer 16, MR sensor 18, antiferromagnetic layer portions 20 and 22, and contacts 24 and 26. MR sensor 18 is a layer of magnetoresistive ferromagnetic material. In preferred embodiments, MR sensor 18 is a layer of permalloy (NiFe). Antiferromagnetic layer portions 20 and 22 consist, in preferred embodiments, of a layer of FeMn. In most preferred embodiments, layer portions 20 and 22 consist of FeMn with 50 percent Fe and 50 percent manganese.

As can be seen from FIG. 1, bottom shield layer 14 is deposited on top of basecoat oxide layer 12. Lower gap oxide layer 16 is deposited on top of bottom shield layer 14. MR sensor or NiFe layer 18 is deposited on top of lower gap oxide layer 16. Antiferromagnetic or FeMn layer portions 20 and 22 are deposited directly on top of NiFe layer 18. Finally, contacts 24 and 26 are deposited directly on top of FeMn layer portions 20 and 22.

In the preferred embodiments of the present invention, the method of fabricating MR head 10 is as follows. Base coat oxide layer 12, bottom shield layer 14 and lower gap oxide layer 16 are deposited under conventional thin film deposition techniques. MR sensor or NiFe layer 18 and FeMn layer portions 20 and 22 are then deposited non-sequentially. That is, MR sensor or NiFe layer 18 is deposited using known deposition techniques and under any conditions necessary to obtain an MR sensor with favorable properties. Typically, NiFe sensor layer 18 is sputter deposited in the presence of an externally applied magnetic field. An externally applied magnetic field of about 50 Oe is frequently used to create the desired magnetic orientations in NiFe sensor layer 18. However, NiFe sensor layer 18 may be deposited under any desirable conditions. For instance, the externally applied magnetic field may be higher or lower than 50 Oe.

Next, MR head 10 is removed from the deposition chamber and patterned and etched by conventional techniques. Because the wafer with MR head 10 was removed from the deposition chamber, approximately 30 Angstroms of the NiFe film oxidizes. Therefore, the next step of the fabrication technique of the present invention is to presputter NiFe sensor layer 18 to achieve a clean surface. Presputtering NiFe sensor layer 18 may be done under conventional methods. Typically, presputtering NiFe sensor layer 18 would include sputter etching layer 18 in a vacuum chamber to remove at least 30 Angstroms. This will usually be sufficient to provide a clean surface for deposition of the FeMn.

The next step in the method of producing an MR head in accordance with the present invention is to deposit FeMn layer portions 20 and 22 onto the surface of NiFe sensor layer 18. FeMn layer portions 20 and 22 are sputter deposited at a very low power and in the absence of any externally applied magnetic field. Depositing the FeMn at very low power promotes a sharp atomic interface between FeMn layer portions 20 and 22 and NiFe sensor layer 18, with very little inter penetration of the FeMn into the NiFe. This is one advantage of the method of the present invention over the prior art because inter penetration of the FeMn into NiFe sensor layer 18 is undesirable. As described below, prior art methods of producing an MR head with high exchange coupling require deposition of the FeMn at a high power, for example, above 2.5 W/cm$^2$. In preferred embodiments of the present invention, FeMn layer portions 20 and 22 are deposited at a deposition power of approximately 70 W (0.2 W/cm$^2$). However, it is clear that other low deposition powers below 200 W (0.7 W/cm$^2$) would suffice. It is important that the deposition power be sufficiently low so that no substantial penetration of the FeMn into the NiFe occurs.

Depositing FeMn layer portions 20 and 22 in the absence of an applied magnetic field results in greatly improved thickness uniformities as compared to prior art methods of producing an MR head with high exchange coupling, all of which appear to require that the NiFe and FeMn layers be deposited sequentially in the presence of an externally applied magnetic field. The benefits of the low power, no-field FeMn deposition are discussed in greater detail below.

Finally, MR head 10 is annealed for a single cycle at temperatures and over time periods which are low compared to most prior art techniques. As will be discussed later with reference to Table III, MR head 10 may be annealed for a single cycle of less than 24 hours at a temperature of less than 250° C. to obtain high exchange fields. In preferred embodiments of the present invention, MR head 10 is annealed for a period of between 6 and 24 hours at a temperature between 200° and 250° C.

As discussed above, prior art MR head fabrication techniques typically require that NiFe sensor layer 18 and FeMn layer portions 20 and 22 be deposited sequentially. In other words, the layers of NiFe and FeMn are typically sputter deposited onto a wafer one after the other without removing the structure from the deposition chamber. As is typical in these prior art fabrication techniques, the NiFe and FeMn layers are deposited with a high deposition power. A typical deposition power is, for example, 2.6 W/cm$^2$. In these prior art methods, NiFe sensor layer 18 is preferably deposited in the presence of an externally applied magnetic field in order to achieve proper magnetic domain orientation. If, as in most prior art methods, the external applied field is provided by permanent magnets attached to wafer holder, then FeMn layer portions 20 and 22 would also be applied in the presence of the same externally applied magnetic field. Depositing FeMn layer portions 20 and 22 in the presence of an externally applied magnetic field results in substantial thickness non-uniformities of the FeMn layer.

FIG. 3 is a graph illustrating exchange field $H_{ex}$ versus the thickness of the FeMn layer. As can be seen from FIG. 3, the magnitude of exchange field $H_{ex}$ increases slightly from 45 Oe to approximately 48 Oe as FeMn thickness increases from about 100 Angstroms to around 175 Angstroms. For FeMn thicknesses above 175 Angstroms, exchange field $H_{ex}$ remains relatively constant. However, it can also be seen that as the thickness of the FeMn layer falls below 100 Angstroms, the magnitude of exchange field $H_{ex}$ decreases rapidly. This is most likely due to incomplete coverage of the NiFe sensor layer with the FeMn layer. This data leads to the conclusion that, so long as complete coverage of the NiFe layer 18 with FeMn is achieved, exchange field $H_{ex}$ is substantially independent of the thickness of the FeMn layer. However, it is desirable in most MR head designs, to reduce the overall height of the structure. Therefore, it is highly advantageous to limit the thickness of the FeMn layer to around 150 Angstroms. As is clearly shown in the graph of FIG. 3, increasing the thickness of the FeMn layer beyond 150 Angstroms produces very little increase in exchange field $H_{ex}$ magnitude.

As previously discussed, it is extremely difficult to obtain thickness uniformities of better than ±10 percent in the FeMn layer when deposition of the FeMn layer is in the presence of an externally applied magnetic field. However, in the absence of an externally applied magnetic field, thickness uniformities of better than ±3 percent can be obtained. The present invention discloses a method of depositing FeMn layer portions 20 and 22 of MR head 10 in the absence of an applied magnetic field. However, as discussed next with reference to Tables I and III, the pre-annealing exchange field $H_{ex}$ obtained when depositing FeMn layer portions 20 and 22 in the absence of an applied magnetic field is significantly lower than the pre-annealing exchange field $H_{ex}$ obtained in the prior art methods in which the FeMn layer is deposited in an externally applied magnetic field. Table I summarizes deposition conditions and results for a number of test wafers deposited with a field under a known deposition method. All of the depositions shown in Table I include a layer of FeMn deposited on a NiFe sensor layer. The depositions were conducted with a deposition power of 200 W (0.7 W/cm$^2$) in an externally applied field of 50 Oe, and with a pressure of 4 mTorr.

Because the magnitude of exchange field $H_{ex}$ varies inversely in proportion to the thickness of NiFe sensor layer 18, Table I shows the actual exchange fields $H_{ex}$ obtained as well as exchange fields adjusted for a nominal NiFe thickness of 300 Angstroms. As can be seen, with a 300 Angstrom NiFe sensor layer, exchange fields $H_{ex}$ of between 48.7 Oe and 54.1 Oe were obtained. The high exchange fields $H_{ex}$ shown in Table I were obtained without annealing. This demonstrates that high exchange fields $H_{ex}$ obtained in prior art methods are unlikely to be the result of third element interdiffusion or extended annealing at high temperatures. Although the exchange fields obtained for the FeMn layers deposited on NiFe sensor layers with a moderate deposition power of 0.7 W/cm$^2$ and in the presence of an applied field may be further increased with extended annealing at high temperature, the increase in the exchange field $H_{ex}$ obtained is not particularly useful. Initial exchange fields of 50 Oe result in an exchange field of 15–25 Oe at the 80° C. operating temperature of most disc drives, which is sufficient for exchange stabilization of the NiFe MR sensor.

TABLE I

EXCHANGE FIELD FOR FeMn DEPOSITED ON NiFe IN 50 Oe FIELD

| Dep. # | Dep. Temp | NiFe thickness | Actual Hex(Oe) | Adj. Hex 300 A NiFe | Hc(Oe) |
|---|---|---|---|---|---|
| 3105 | 25 | 321 | 49.0 | 52.5 | 5.0 |
| 3106 | 25 | 348 | 45.0 | 52.1 | 5.0 |
| 3107 | 25 | 348 | 44.5 | 51.6 | 4.5 |
| 3108 | 25 | 348 | 42.0 | 48.7 | 5.0 |
| 3117 | 25 | 354 | 45.0 | 53.1 | 5.0 |
| 3118 | 25 | 334 | 48.5 | 54.1 | 4.5 |
| 3119 | 25 | 367 | 43.5 | 53.2 | 4.5 |
| 3021 | 25 | 328 | 46.0 | 50.3 | 5.0 |

Table II shows the test results of depositions of FeMn under a variety of conditions. Because the existence of an exchange field $H_{ex}$ makes it difficult to measure the thickness and sheet resistance of the FeMn, on some of the wafers shown in Table II, the FeMn was deposited on a glass substrate. Without the presence of a ferromagnetic sensor layer, no exchange coupling can result. Wafers 1A, A1 and A2 correspond to an FeMn layer deposited on a glass substrate in order to prevent the occurrence of an exchange field. Wafer 1A was deposited with a deposition power of 200 W and in an applied field of 50 Oe. Wafer A1, was deposited with a deposition power of 200 W, but in the absence of any external applied magnetic field. Like wafer A1, wafer A2 was deposited in the absence of an external applied field, but with a significantly lower deposition power of 70 W. All depositions in table II were deposited with a Ar pressure of 4 mTorr.

TABLE II

COMPARISON OF FIELD AND NO-FIELD FeMn DEPOSITION CONDITIONS

| Wafer I.D. | Base | Field (Oe) | Dep. Power ** (w) | Target Substrate Voltage (V) | Dep. Rate (A/min) | Thickness Uniformity 3" wafer (%) | Hex (300A) preanneal (Oe) | Hex (300A) (annealed) (Oe) |
|---|---|---|---|---|---|---|---|---|
| 1A | Glass | 50 | 200 | 850 | 205 | 11.61 | NA | NA |
| X | NiFe* | 50 | 200 | 850 | NA | NA | 52 | — |
| A1 | Glass | 0 | 200 | 1450 | 147 | 2.62 | NA | NA |
| Y | NiFe* | 0 | 200 | 1450 | NA | NA | 29.0 | — |
| A2 | Glass | 0 | 70 | 925 | 61 | 1.45 | NA | NA |

TABLE II-continued

COMPARISON OF FIELD AND NO-FIELD FeMn DEPOSITION CONDITIONS

| Wafer I.D. | Base | Field (Oe) | Dep. Power ** (w) | Target Substrate Voltage (V) | Dep. Rate (A/min) | Thickness Uniformity 3" wafer (%) | Hex (300A) preanneal (Oe) | Hex (300A) (annealed) (Oe) |
|---|---|---|---|---|---|---|---|---|
| Z | NiFe* | 0 | 70 | 925 | NA | NA | 36.7 | 51.8 |

X = Average of data from the wafers of Table I.
Y = Average of data from 2 wafers
Z = Average of data from the wafers of Table III.
* = 300–370 A NiFe film.
** = For a 3 inch round wafer, 200 watts deposition power corresponds to a power density of approximately 0.7 W/cm² and a 70 watts deposition power corresponds to a power density of approximately 0.2 W/cm².

As can be seen from the data in Table II, the FeMn thickness uniformities of wafers A1 and A2 show extreme improvement over the 11.61 percent FeMn thickness uniformity of wafer 1A. This highly advantageous result is clearly due to the absence of an applied field during deposition of the FeMn layer on wafers A1 and A2. However, it can also be seen from Table II that wafer A2 has a uniformity which is significantly better than that of wafer A1. Wafer A2 has a thickness uniformity of 1.45 percent as compared to the 2.62 percent thickness uniformity of wafer A1. This non-negligible and extremely valuable result appears to be due to the lower deposition power of wafer A2 as compared to wafer A1.

Table II clearly shows that improvements in thickness uniformity can be obtained by depositing the layer of FeMn at lower deposition powers and in the absence of an applied of an magnetic field. However, another important result is also shown in the data of Table II. The average results of Table I are shown in the second row of Table II and are generically labelled as wafer X. These results once again show that a high exchange field of approximately 52 Oe can be obtained by depositing the layer of FeMn on the layer of NiFe in an applied field of 50 Oe and with a deposition power of 200 W. The fourth row, which corresponds to an average generically labeled as wafer Y, shows that while depositing the layer of FeMn at the higher power of 200 W but in the absence of an applied field may result in improved thickness uniformity, the resulting exchange field $H_{ex}$ is significantly lower than the exchange field obtained with a 200 W deposition power and a 50 Oe applied field. The most significant results are shown in row six, which is an average of deposition data from Table III which will be discussed below. This row is generically labelled as wafer Z. The data of row six shows that the pre-annealed exchange field for the 70 W deposition averages about 8 Oe higher than the 200 W no field deposition. After a single annealing, however, the average of the exchange fields $H_{ex}$ rises to 51.8 Oe, nearly as high as the high exchange field obtained when depositing at 200 W in a 50 Oe applied field.

Table III shows data which further explores the results obtained with the improved method of producing MR heads with high exchange coupling of the present invention. Table III shows the effects of various annealing temperatures and time periods on MR heads in which FeMn layer portions 20 and 22 were deposited at a low power of 70 W and in the absence of an external applied magnetic field.

All of the MR heads used to obtain the data of Table III were deposited under the no-field low power non-sequential FeMn deposition technique of the present invention. The anneal temperatures range from 212° C. to 247° C. The anneal times range from 7 hours to 26 hours. As can be seen by the before anneal exchange fields obtained for a nominal NiFe thickness of 300 Angstroms, the before anneal exchange fields obtained with the method of the present invention are far lower than exchange fields obtained under prior art sequential deposition techniques. The before anneal adjusted exchange fields range from 33.4 Oe to 40.0 Oe. However, as can be seen from the after anneal exchange fields adjusted for a nominal NiFe thickness of 300 Angstroms, very significant improvement in the exchange field $H_{ex}$ can be obtained under the method of the present invention with a single very short anneal cycle at a temperature which is significantly lower than most prior art methods. After anneal, the adjusted exchange field $H_{ex}$ for all wafers increased significantly. The after anneal exchange fields $H_{ex}$ for the 10 wafers in Table III ranged from 47.3 Oe to 59.2 Oe.

TABLE III

EXCHANGE FIELD FOR FeMn DEPOSITED ON NiFe WITHOUT FIELD

| Waf # | Anneal Temp (°C.) | Anneal Time (Hr) | Final $t_{FeMn}$ (A) | $H_{ex}$ dep'd | $H_{ex}$ @ 300A | $H_c$ | $H_{ex}$ dep'd | $H_{ex}$ @ 300A | $H_c$ |
|---|---|---|---|---|---|---|---|---|---|
| 1 | 228 | 19 | 348 | 34.5 | 40.0 | 9.5 | 41.0 | 47.5 | 5.0 |
| 2 | 226 | 7 | 374 | 31.0 | 38.6 | 6.0 | 38.0 | 47.3 | 5.0 |
| 3 | 230 | 26 | 346 | 30.0 | 34.6 | 8.0 | 47.5 | 54.8 | 10.5 |
| 4 | 225 | 13 | 334 | 30.0 | 33.4 | 8.0 | 45.0 | 50.1 | 9.0 |
| 5 | 225 | 12 | 307 | 34.0 | 34.8 | 7.0 | 50.0 | 51.2 | 8.0 |
| 6 | 225 | 11 | 329 | 30.5 | 33.4 | 7.5 | 45.0 | 49.4 | 8.0 |
| 7 | 227 | 19 | 348 | 32.5 | 37.7 | 6.5 | 51.0 | 59.2 | 7.0 |
| 8 | 212 | 9 | 335 | 34.5 | 38.5 | 7.0 | 43.0 | 48.0 | 7.0 |
| 9 | 247 | 11 | 325 | 34.0 | 36.8 | 8.0 | 53.0 | 57.4 | 9.0 |
| 10 | 228 | 13 | 343 | 34.0 | 38.9 | 8.0 | 46.0 | 52.6 | 6.0 |

A very important aspect of the method of present invention is that the FeMn layer portions 20 and 22 may be deposited using the significantly more manufacturable no-field low power non-sequential method disclosed, while high exchange fields can still be obtained with a single short anneal cycle at a relatively low temperature. The low power deposition prevents FeMn penetration of the NiFe layer. The no-field aspect of the-deposition provides improved FeMn thickness uniformity. The low anneal temperatures and times make the inventive method of producing MR heads with high exchange coupling substantially more manufacturable than prior art methods.

Figure 4:
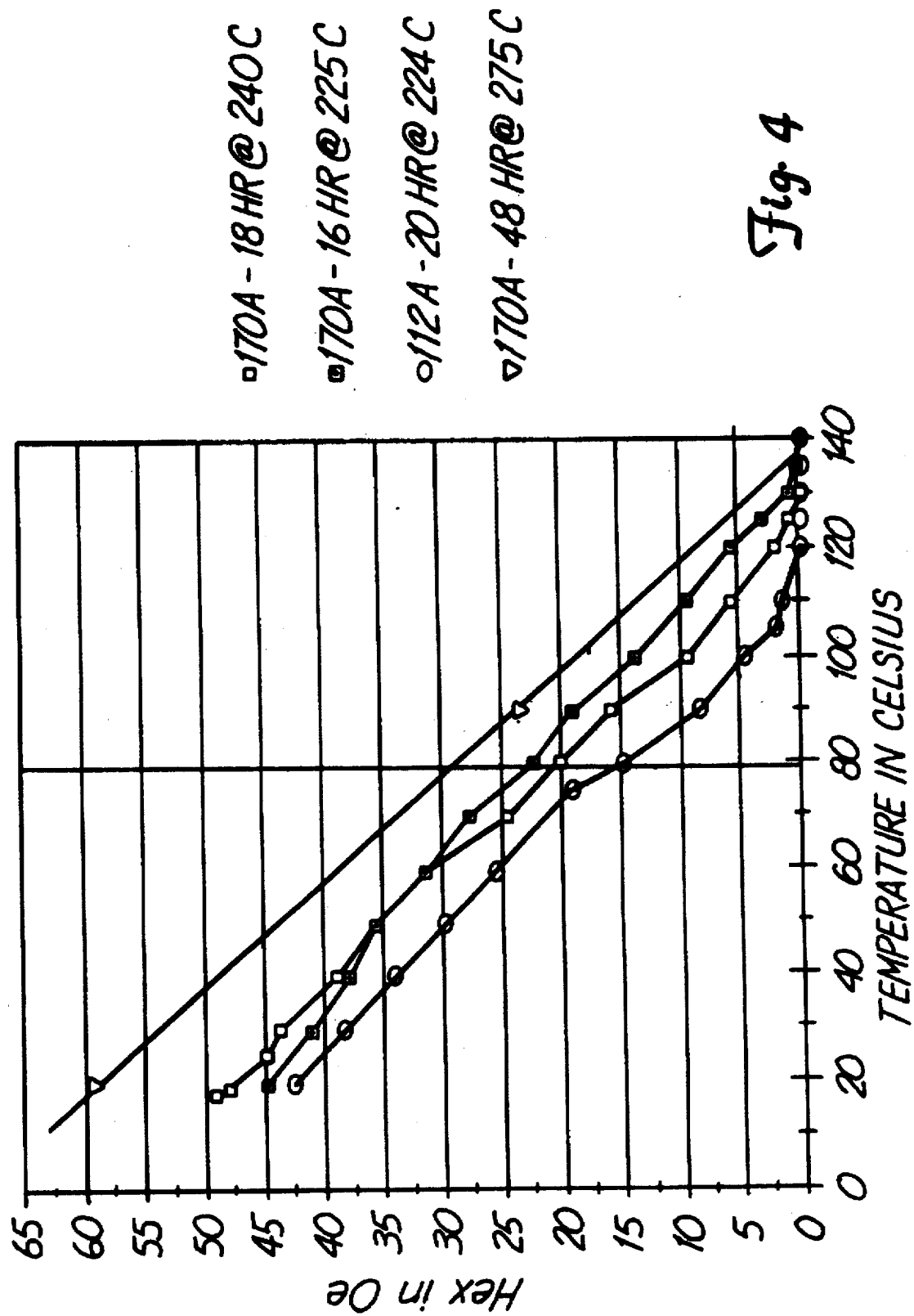
FIG. 4 is a graph illustrating exchange field magnitude versus temperature for MR heads produced with various annealing temperatures and time periods.

FIG. 4 is a graph showing exchange fields $H_{ex}$ versus temperature for NiFe/FeMn film couples produced according to the present invention and annealed under four different conditions. It can be seen that annealing at a high temperature of 275° C. for 48 hours will result in higher exchange fields. Since an exchange field $H_{ex}$ of 20 Oe should be quite adequate for exchange stabilization, the increase is not overly significant at the 80° C. operating temperature of most disc drives. Therefore, the method of the present invention is shown to provide more than adequate exchange fields at disc drive operating temperatures with anneal conditions significantly lower than prior art methods.

The method of the present invention produces an MR transducer having improved longitudinal bias due to high exchange coupling. The low deposition powers necessary in the present invention prevent substantial penetration of the FeMn into the NiFe. Depositing the FeMn layer in the absence of significant magnetic fields produces better uniformity in the FeMn film. This in turn provides many advantages, including the fact that thinner FeMn films may be utilized without risking incomplete coverage of the NiFe film. The low anneal temperatures and short anneal times necessary to achieve high exchange coupling greatly increase manufacturability over prior art techniques.

It must be noted that the method of the present invention of producing magnetoresistive read transducers with high exchange coupling can be modified slightly for other related applications while still achieving similar improved results. For instance, as discussed and shown above, the low power no-field FeMn deposition and the subsequent short time and low temperature annealing aspects of the present invention result in FeMn films which have greatly improved thickness uniformity and very little penetration of the FeMn into the magnetoresistive ferromagnetic film on which the FeMn is deposited. These improvements over prior art methods of producing magnetoresistive transducers are realized while still achieving exchange bias fields which are similar in magnitude to those achieved in many prior art methods.

The improved thickness uniformity and lack of interpenetration of FeMn into the magnetoresistive film provides the capability of utilizing FeMn film layers as the antiferromagnetic spacing layer in "spin valve" or giant magnetoresistive effect transducers. A "spin-valve" or giant MR device is a multi-layered "sandwich" including either: (1) alternating layers of a magnetoresistive material such as CO or Fe and a non-magnetic metal such as Au or Cu; or (2) a similar set of alternating films, except that permalloy is part of the repeating sandwich.

In some embodiments of giant MR devices an antiferromagnetic film such as FeMn replaces the non-magnetic film. In these embodiments, the present invention provides highly desirable film properties for the sandwich layers. The thickness uniformity provided by the present invention provides a substantial advantage in the manufacture of giant MR devices because of the extreme sensitivity of these devices to the thickness of the spacing layer. The sharp atomic interface produced by the low power deposition is necessary for giant MR devices. Also, inter-penetration of the layers degrades the giant MR effect. This undesirable result is avoided with the method of the present invention. Therefore, with slight modifications, the present invention could be used in the production of giant MR devices.

Although the present invention has been described with reference to preferred embodiments, workers skilled in the art will recognize that changes may be made in form and detail without departing from the spirit and scope of the invention.

What is claimed is:

1. A magnetoresistive read transducer with improved longitudinal bias due to high exchange coupling, the magnetoresistive read transducer comprising:

a layer of magnetoresistive ferromagnetic material, the layer of ferromagnetic material comprising an alloy of nickel and iron; and a layer of antiferromagnetic material in direct contact with the layer of ferromagnetic material, the layer of antiferromagnetic material having a thickness uniformity of less than 2.7 percent over an area of at least 45 $cm^2$, the layer of ferromagnetic material and the layer of antiferromagnetic material magnetically interacting to produce an exchange field, the exchange field having a normalized value of at least 47 Oe for a normalized ferromagnetic material thickness of about 300 Angstroms.

2. The magnetoresistive read transducer of claim 1, wherein the layer of antiferromagnetic material comprises an alloy of iron and manganese.

3. The magnetoresistive read transducer of claim 1, wherein the layer of antiferromagnetic material is no more than 374 Angstroms thick.

4. The magnetoresistive read transducer of claim 1, including a pair of conductive contacts in direct contact with the layer of antiferromagnetic material.

5. The magnetoresistive read transducer of claim 4, wherein the layer of antiferromagnetic material is no more than 374 Angstroms thick.

6. A magnetoresistive read transducer with improved longitudinal bias due to high exchange coupling, the magnetoresistive read transducer comprising:

a layer of magnetoresistive ferromagnetic material, the layer of ferromagnetic material comprising an alloy of nickel and iron; and a layer of antiferromagnetic material in direct contact with the layer of ferromagnetic material, the layer of antiferromagnetic material having a thickness uniformity of less than 1.5 percent over an area of at least 45 $cm^2$, the layer of ferromagnetic material and the layer of antiferromagnetic material magnetically interacting to produce an exchange field, the exchange field having a normalized value of at least 47 Oe for a normalized ferromagnetic material thickness of about 300 Angstroms.

7. The magnetoresistive read transducer of claim 6, including a pair of conductive contacts in direct contact with the layer of antiferromagnetic material.

8. The magnetoresistive read transducer of claim 7, wherein the layer of antiferromagnetic material is no more than 374 Angstroms thick.

9. The magnetoresistive read transducer of claim 6, wherein the layer of antiferromagnetic material is no more than 374 Angstroms thick.

10. A magnetoresistive read transducer with improved longitudinal bias due to high exchange coupling produced by providing a layer of magnetoresistive ferromagnetic material on a substrate and sputter depositing a layer of antiferromagnetic material onto the layer of ferromagnetic material at a deposition power density no greater than 0.7 $W/cm^2$ and a deposition pressure no greater than 4 mTorr in a magnetic field no greater than 10 Oe, the magnetoresistive read transducer being characterized by:

the layer of magnetoresistive ferromagnetic material comprising an alloy of nickel and iron; and the layer of antiferromagnetic material being in direct contact with the layer of ferromagnetic material, the layer of antiferromagnetic material having a thickness uniformity of less than 2.7 percent over an area of at least 45 $cm^2$, the layer of ferromagnetic material and the layer of antiferromagnetic material magnetically interacting to produce an exchange field having a normalized value of at least 47 Oe for a normalized ferromagnetic material thickness of about 300 Angstroms.

11. The magnetoresistive read transducer of claim 10, including a pair of conductive contacts in direct contact with the layer of antiferromagnetic material.

12. The magnetoresistive read transducer of claim 10, wherein the layer of antiferromagnetic material is no more than 374 Angstroms thick.

13. The magnetoresistive read transducer of claim 10, wherein the thickness uniformity is less than 1.5 percent over an area of at least 45 $cm^2$.

14. The magnetoresistive read transducer of claim 10, wherein the layer of ferromagnetic material and the layer of antiferromagnetic material are annealed together at a temperature between about 200° C. and 250° C. for a period no greater than 26 hours.

* * * * *

UNITED STATES PATENT AND TRADEMARK OFFICE
CERTIFICATE OF CORRECTION

PATENT NO. : 5,666,247

DATED : SEPTEMBER 9, 1997

INVENTOR(S) : ALLAN E. SCHULTZ

It is certified that error appears in the above-indentified patent and that said Letters Patent is hereby corrected as shown below:

On the title page, item [54] and
Col. 1, line 1, delete "FEMN", insert --FeMn--

Col. 2, line 12, delete "inneal-", insert --anneal- --

Col. 2, line 27, delete "Fe Mn", insert --FeMn--

Col. 3, line 15, delete ";", insert --,--

Col. 7, line 53, delete "no field", insert --no-field--

Col. 8, line 24, delete "fields range", insert --fields $H_{ex}$ range--

Col. 8, line 43, delete "9.5", insert --8.5--

Col. 8, line 60, delete "the-deposition", insert --the deposition--

Signed and Sealed this

Seventh Day of April, 1998

Attest:

BRUCE LEHMAN

*Attesting Officer*    *Commissioner of Patents and Trademarks*